(12) United States Patent
Wu et al.

(10) Patent No.: US 10,408,041 B2
(45) Date of Patent: Sep. 10, 2019

(54) WELL RANGING APPARATUS, SYSTEMS, AND METHODS

(71) Applicant: Halliburton Energy Services, Inc., Houston, TX (US)

(72) Inventors: Hsu-Hsiang Wu, Sugar Land, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/858,521

(22) Filed: Dec. 29, 2017

(65) Prior Publication Data

US 2018/0142549 A1    May 24, 2018

Related U.S. Application Data

(62) Division of application No. 14/769,527, filed as application No. PCT/US2015/043604 on Aug. 4, 2015, now Pat. No. 9,879,521.

(Continued)

(51) Int. Cl.
*E21B 47/022* (2012.01)
*G01V 3/26* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC ....... G01V 3/24; G01V 3/26; E21B 47/02216
(Continued)

(56) References Cited

U.S. PATENT DOCUMENTS

| 4,372,398 A | 2/1983 | Kuckes |
| 4,443,762 A | 4/1984 | Kuckes |

(Continued)

FOREIGN PATENT DOCUMENTS

| WO | 2013162505 A1 | 10/2013 |
| WO | 2014089402 A2 | 6/2014 |

(Continued)

OTHER PUBLICATIONS

CA Application Serial No. 2954674, Examiner's Letter, dated Dec. 12, 2017, 3 pages.

(Continued)

*Primary Examiner* — Reena Aurora
(74) *Attorney, Agent, or Firm* — Gilliam IP PLLC

(57) ABSTRACT

An apparatus includes a down hole tool housing attached to a ranging electromagnetic field strength sensor. The ranging electromagnetic field strength sensor is to measure electromagnetic field strength components associated with an electromagnetic field originating at a first well, via at least one of direct transmission and backscatter transmission, when the down hole tool housing is disposed in a second well, to provide ranging measurements to calculate an approximate range between the first well and the second well. The apparatus includes a reference electromagnetic field strength sensor to provide a closed loop current path around the down hole tool housing, to provide distorting field strength measurements.

16 Claims, 13 Drawing Sheets

Related U.S. Application Data

(60) Provisional application No. 62/035,877, filed on Aug. 11, 2014, provisional application No. 62/037,440, filed on Aug. 14, 2014, provisional application No. 62/078,732, filed on Nov. 12, 2014.

(51) Int. Cl.

| | | |
|---|---|---|
| *E21B 7/04* | (2006.01) | |
| *E21B 33/14* | (2006.01) | |
| *E21B 47/024* | (2006.01) | |
| *G01V 99/00* | (2009.01) | |
| *G06F 17/11* | (2006.01) | |
| *E21B 43/24* | (2006.01) | |
| *E21B 47/12* | (2012.01) | |
| *E21B 47/18* | (2012.01) | |

(52) U.S. Cl.
CPC ............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
USPC ........................................................ 324/355
See application file for complete search history.

(56) References Cited

U.S. PATENT DOCUMENTS

| | | | |
|---|---|---|---|
| 4,700,142 A | 10/1987 | Kuckes | |
| 4,763,520 A | 8/1988 | Titchener et al. | |
| 5,065,100 A | 11/1991 | Vail, III | |
| 5,084,678 A | 1/1992 | Rutin | |
| 5,189,415 A | 2/1993 | Shimada et al. | |
| 5,230,387 A | 7/1993 | Waters et al. | |
| 5,258,755 A | 11/1993 | Kuckes | |
| 5,305,212 A | 4/1994 | Kuckes | |
| 5,485,089 A | 1/1996 | Kuckes | |
| 5,512,830 A | 4/1996 | Kuckes | |
| 5,582,248 A | 12/1996 | Estes | |
| 5,589,775 A | 12/1996 | Kuckes | |
| 5,923,170 A | 7/1999 | Kuckes | |
| 6,179,066 B1 | 1/2001 | Nasr et al. | |
| 6,525,540 B1 | 2/2003 | Kong et al. | |
| 6,985,814 B2 | 1/2006 | McElhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,962,287 B2 | 6/2011 | Clark | |
| 7,969,819 B2 | 6/2011 | Hall et al. | |
| 8,011,451 B2 | 9/2011 | MacDonald | |
| 8,126,650 B2 | 2/2012 | Lu et al. | |
| 8,237,443 B2 | 8/2012 | Hopmann et al. | |
| 8,324,912 B2 | 12/2012 | Waid | |
| 8,462,012 B2* | 6/2013 | Clark | E21B 47/02216 340/853.1 |
| 8,680,866 B2 | 3/2014 | Marsala et al. | |
| 8,749,243 B2 | 6/2014 | Bittar et al. | |
| 8,844,648 B2 | 9/2014 | Bittar et al. | |
| 9,581,718 B2 | 2/2017 | Rodney | |
| 9,702,240 B2 | 7/2017 | Bittar et al. | |
| 2002/0000808 A1 | 1/2002 | Nichols | |
| 2003/0137297 A1 | 7/2003 | Ganesan | |
| 2005/0218898 A1* | 10/2005 | Fredette | E21B 47/01 324/342 |
| 2006/0113112 A1 | 6/2006 | Waters | |
| 2006/0131013 A1 | 6/2006 | McElhinney | |
| 2007/0126426 A1 | 6/2007 | Clark et al. | |
| 2008/0177475 A1 | 7/2008 | McElhinney et al. | |
| 2008/0275648 A1 | 11/2008 | Illfelder | |
| 2009/0164127 A1 | 6/2009 | Clark | |
| 2009/0178850 A1 | 7/2009 | Waters et al. | |
| 2009/0260878 A1 | 10/2009 | Morley et al. | |
| 2009/0308657 A1 | 12/2009 | Clark et al. | |
| 2010/0194395 A1 | 8/2010 | McElhinney | |
| 2010/0300756 A1 | 12/2010 | Bergstrom et al. | |
| 2010/0332137 A1 | 12/2010 | Meadows et al. | |
| 2011/0015862 A1 | 1/2011 | Sato et al. | |
| 2011/0018542 A1 | 1/2011 | Clark et al. | |
| 2011/0088890 A1 | 4/2011 | Clark | |
| 2011/0284731 A1 | 11/2011 | Roscoe et al. | |
| 2011/0290011 A1 | 12/2011 | Dowla et al. | |
| 2011/0308859 A1* | 12/2011 | Bittar | E21B 47/022 175/45 |
| 2011/0309836 A1 | 12/2011 | Bittar et al. | |
| 2012/0001637 A1 | 1/2012 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0273192 A1 | 11/2012 | Schmidt et al. | |
| 2012/0283951 A1 | 11/2012 | Li et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0069655 A1 | 3/2013 | McElhinney et al. | |
| 2013/0151158 A1 | 6/2013 | Brooks et al. | |
| 2013/0173164 A1 | 7/2013 | Zhang | |
| 2013/0184995 A1 | 7/2013 | Sinclair et al. | |
| 2013/0333946 A1 | 12/2013 | Sugiura | |
| 2014/0132272 A1 | 5/2014 | Cuevas et al. | |
| 2014/0145857 A1 | 5/2014 | Comparetto | |
| 2014/0191120 A1 | 7/2014 | Donderici et al. | |
| 2014/0374159 A1 | 12/2014 | McElhinney et al. | |
| 2015/0013968 A1 | 1/2015 | Hsu et al. | |
| 2015/0240623 A1 | 8/2015 | Blangé et al. | |
| 2015/0378044 A1 | 12/2015 | Brooks | |
| 2016/0216396 A1 | 7/2016 | Golla et al. | |
| 2016/0258275 A1 | 9/2016 | Wu et al. | |
| 2016/0273338 A1 | 9/2016 | Wu | |
| 2016/0273339 A1 | 9/2016 | Wu | |
| 2016/0273340 A1 | 9/2016 | Roberson et al. | |
| 2016/0273342 A1 | 9/2016 | Wu et al. | |
| 2016/0273343 A1 | 9/2016 | Donderici et al. | |
| 2016/0273344 A1 | 9/2016 | Wu et al. | |

FOREIGN PATENT DOCUMENTS

| | | |
|---|---|---|
| WO | 2016025230 A1 | 2/2016 |
| WO | 2016025232 A1 | 2/2016 |
| WO | 2016025235 A1 | 2/2016 |
| WO | 2016025237 A1 | 2/2016 |
| WO | 2016025238 A1 | 2/2016 |
| WO | 2016025245 A1 | 2/2016 |
| WO | 2016025247 A1 | 2/2016 |

OTHER PUBLICATIONS

CA application serial No. 2954726 Examiner's Letter dated Dec. 12, 2017, 3 pages.
Definition of well head accessed through Schlumberger Oilfield Glossary on Nov. 15, 2016 via http://www.glossary.oilfield.slb.com/Terms/w/wellhead.aspx, 2 pages.
Definition of cement accessed through Schlumberger Oilfield Glossary on Nov. 15, 2016 via http://www.glossary.oilfield.slb.com/Terms/c/cement.aspx, 3 pages.
"International Application Serial No. PCT/US2015/043557, International Preliminary Report on Patentability dated Feb. 23, 2017", 7 pages.
"International Application Serial No. PCT/US2015/043557, International Search Report dated Oct. 19, 2015", 3 pages.
"International Application Serial No. PCT/US2015/043557, Written Opinion dated Oct. 19, 2015", 5 pages.
"International Application Serial No. PCT/US2015/043566, International Search Report dated Oct. 26, 2015", 3 pages.
"International Application Serial No. PCT/US2015/043566, Written Opinion dated Oct. 26, 2015", 11 pages.
"International Application Serial No. PCT/US2015/043577, International Search Report dated Oct. 21, 2015", 3 pages.

(56) References Cited

OTHER PUBLICATIONS

"International Application Serial No. PCT/US2015/043577, Written Opinion dated Oct. 21, 2015", 9 pages.
"International Application Serial No. PCT/US2015/043580, International Search Report dated Nov. 11, 2015", 3 pages.
"International Application Serial No. PCT/US2015/043580, Written Opinion dated Nov. 11, 2015", 9 pages.
"International Application Serial No. PCT/US2015/043587, International Search Report dated Oct. 26, 2015", 3 pages.
"International Application Serial No. PCT/US2015/043587, Written Opinion dated Oct. 26, 2015", 11 pages.
"International Application Serial No. PCT/US2015/043604, International Search Report dated Oct. 28, 2015", 3 pages.
"International Application Serial No. PCT/US2015/043604, Written Opinion dated Oct. 28, 2015", 14 pages.
"International Application Serial No. PCT/US2015/043621, International Search Report dated Oct. 19, 2015", 3 pages.
"International Application Serial No. PCT/US2015/043621, Written Opinion dated Oct. 19, 2015", 5 pages.
"International Application Serial No. PCT/US2015/043639, International Search Report dated Oct. 27, 2015", 3 pages.
"International Application Serial No. PCT/US2015/043639, Written Opinion dated Oct. 27, 2015", 10 pages.
Van Dongen, "A Directional Borehole Radar System for Subsurface Imaging", DUP Science, Jan. 1, 2002 00:00:00.0, 111 pages.
GCC Application Serial No. 2015/29857; GCC Examination Report; dated Jan 23, 2018, 4 pages.
GCC Application Serial No. 2015/29856, GCC Examination Report; dated Jan 23, 2018, 4 pages.
GCC Application Serial No. 2015/29871, GCC Examination Report, dated Feb 28, 2018, 5 pages.
Canadian Application Serial No. 2,954,301; Examiners Letter; dated Jun. 1, 2018, 6 pages.
GCC Application Serial No. 2015/29874; GCC Examination Report; dated Jan 23, 2018, 6 pages.
GCC Application Serial No. 2015/29873; GCC Examination Report; dated Feb 8, 2018, 8 pages.
GCC Application Serial No. 2015/29856; Second Examination Report; dated Jun. 24, 2018, 3 pages.
GCC Application Serial No. 2015/29857; Second Examination Report; dated Jun. 24, 2018, 3 pages.
GCC Application Serial No. 2015/29873; Second Examination Report; dated Jun. 24, 2018, 3 pages.
Canadian Application Serial No. 2,954,657; Examiner's Letter; dated Jun. 5, 2018, 4 pages.
Canadian Application Serial No. 2,954,668; Examiner's Letter; dated Jun. 6, 2018, 4 pages.
GCC Application Serial No. 2015/29874; Second Examination Report; dated Jun. 24, 2018, 4 pages.
Canadian Application Serial No. 2,954,303; Examiner's Letter; dated Jul. 24, 2018, 5 pages.
Canadian Application No. 2,954,666; Examiner's Letter; dated Jul. 30, 2018, 6 pages.
GCC Application Serial No. 2015/29871; 2nd Examination Letter: dated Aug. 30, 2018, 4 pages.
GCC Application Serial No. 2015/29872; Examination Report; dated Nov 22, 2018, 4 pages.

* cited by examiner

WELL RANGING APPARATUS, SYSTEMS, AND METHODS

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
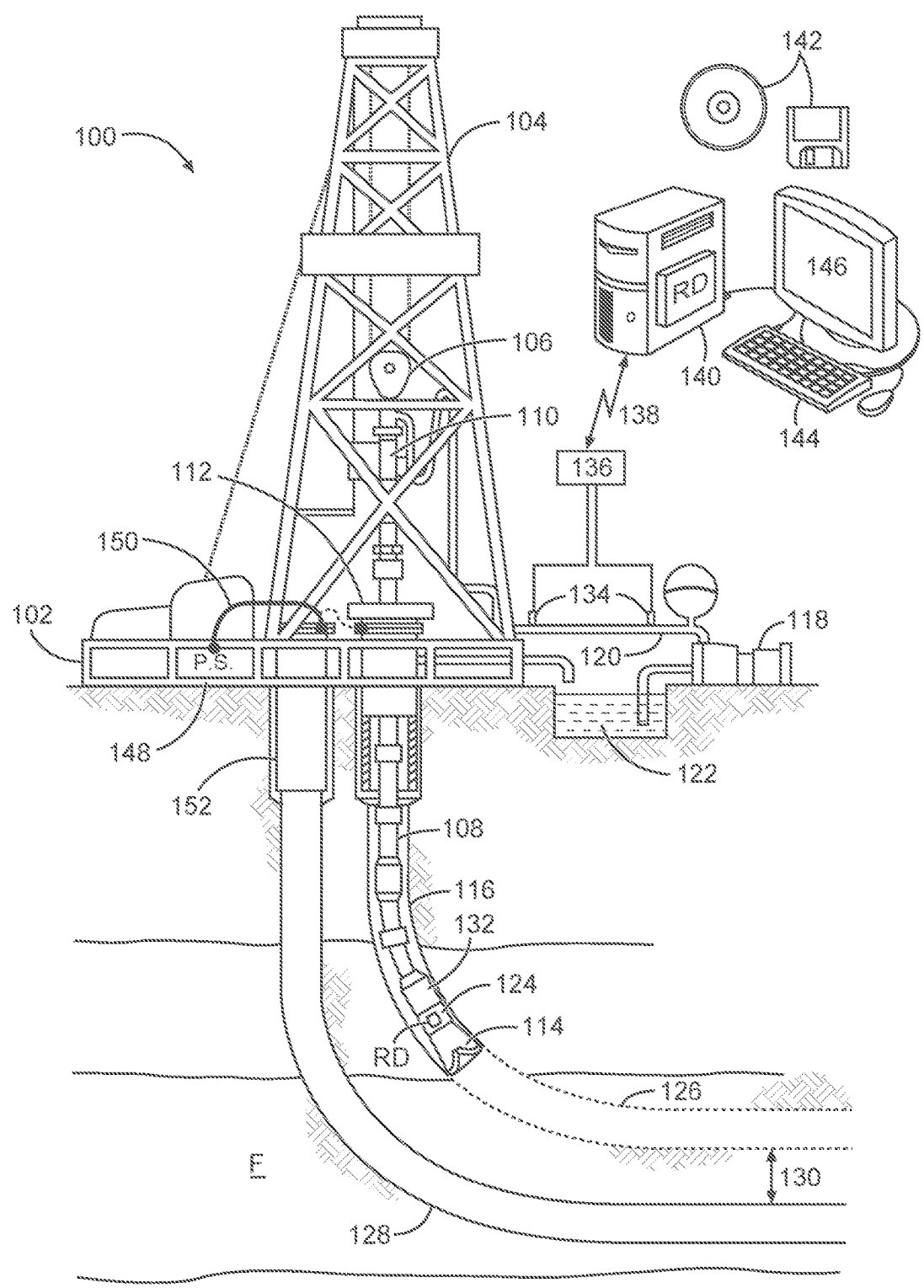
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The bottom-hole assembly further includes a ranging tool 124 to receive signals from current injected by a surface power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

For a two-sensor range measurement configuration, such as when both sensors are mounted to a drill string in the same azimuthal plane, an insert current may result from bottom hole assembly (BHA) conductive current. In this case, the insert current flows from the drill collar to the insert, and exists inside the measurement radius of the sensors. Any current that flows within the sensor radius can distort the ranging measurement. These distorting currents can also flow through other components within the well, such as drilling mud.

As a solution to this technical problem, the inventors have developed a variety of apparatus, systems, and methods to identify insert current effects on ranging sensor measurements, and to reduce these effects. The result of implementing various embodiments may be improved accuracy when determining the range between wells. Sensor noise effects on ranging performance may also be reduced. Several embodiments that may provide some of these advantages will now be described.

Detailed Presentation

In a first set of embodiments, the effect of the distorting current may be offset by installing multiple reference sensors in a circular path, approximately matching the radius of the ranging measurement sensors. The reference sensors may be installed along other radii, using a larger or smaller radius, but it may be easier to average measurements along the circle of reference sensors when all sensors (e.g., the regular measurement sensors and reference sensors) are located at the same radial distance from the tool longitudinal centerline. The greater the number of reference sensors that are used, the more the measurement accuracy results should improve.

In a second set of embodiments, a closed path reference sensor is used to determine the magnitude of the insert current. The insert current magnitude is then used to calibrate measurements made by one or more ranging sensors.

Figure 2:
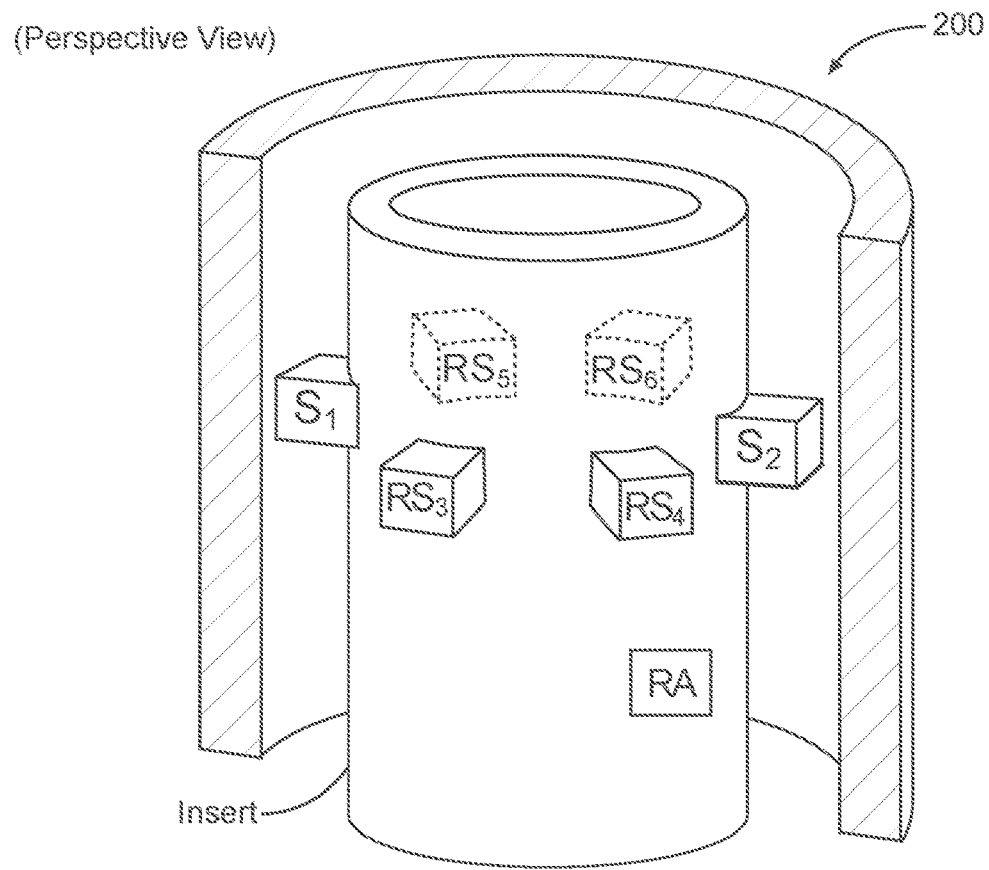
FIG. 2 illustrates perspective and top views of a well ranging apparatus, according to various embodiments.
Figure 2:
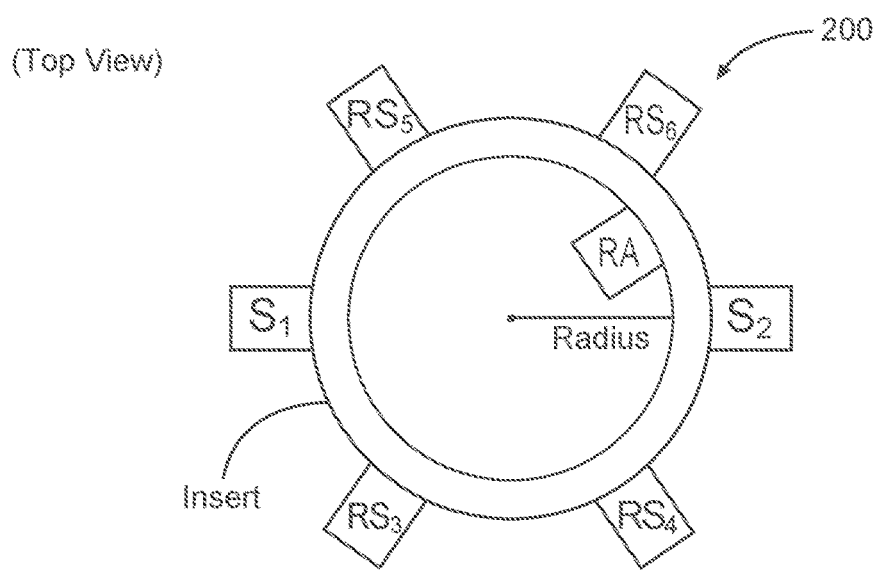
Figure 3:
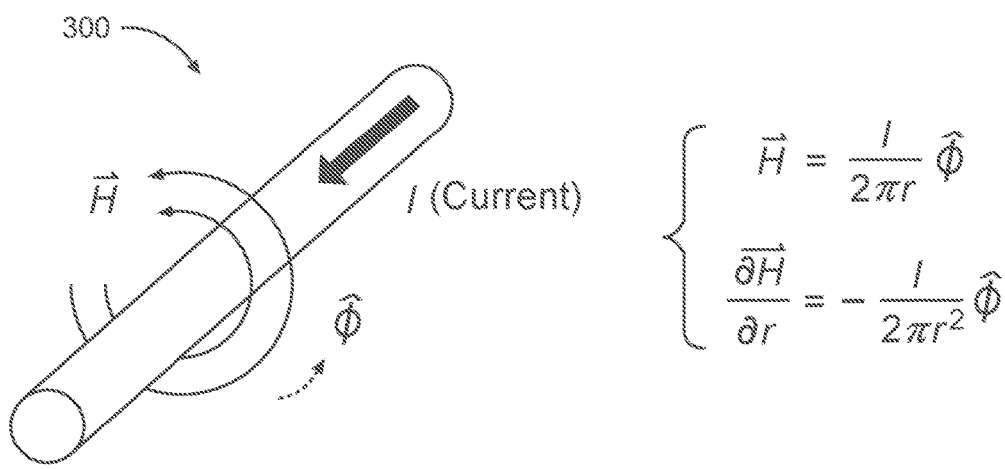
FIGS. 3 to 9 illustrate a variety of apparatus, method, and system configurations for various range determination embodiments.

FIG. 2 illustrates perspective and top views of a well ranging apparatus 200, according to various embodiments. Here ranging sensors S1, S2 are shown. According to the first set of embodiments, their measurement accuracy can be improved by the addition of reference sensors RS3, RS4, RS5, and RS6. As shown, all sensors (S1, S2, RS3, RS4, RS5, and RS6) are attached to a down hole housing, such as a ranging tool or BHA, at approximately the same radial distance from the housing centerline 210.

In surface excitation applications, excitation current may be injected into a target well, with sensors located in a drilling well, perhaps in the BHA. The sensors are utilized to detect the signals generated by the target well current, and thereafter determine the relative ranging distance and direction between the target well and the drilling well. However, it has been determined that a portion of the surface excitation current will flow from the target well into the drilling well, causing so-called leakage current in the BHA. The flow of leakage current, in turn, will introduce current flowing in the tool insert, owing to conductive materials in the insert. The insert current will then introduce an additional signal into the sensors, disturbing the sensor measurements, and affecting ranging performance accuracy. Consequently, this disclosure describes detailed processing methods and corresponding tool configurations to determine the magnitude of the insert current, and to reduce the effect of the insert current on sensor measurements for ranging applications.

Fundamentals of Range Determination

FIGS. 3 to 9 illustrate a variety of apparatus, method, and system configurations for various range determination embodiments. To begin, the reader is referred to FIG. 3, which shows the magnetic field H for an infinite line source 300 with a constant current I. Based on Ampere's law, the magnetic field H at low frequency surrounding the line source 300 can be expressed as:

$$\vec{H} = \frac{I}{2\pi r}\hat{\Phi}, \quad (1)$$

where r is the distance between the measurement point and the infinite line source. In addition, the gradient field can be given by:

$$\frac{\partial \vec{H}}{\partial r} = -\frac{I}{2\pi r^2}\hat{\Phi}. \quad (2)$$

Consequently, the distance r can be directly computed by taking a ratio of the amplitude of Equation (1) to amplitude of Equation (2), given by:

$$\left|\frac{\vec{H}}{\frac{\partial \vec{H}}{\partial r}}\right| = \left|\frac{\frac{I}{2\pi r}}{\frac{-I}{2\pi r^2}}\right| = r. \quad (3)$$

Figure 4:
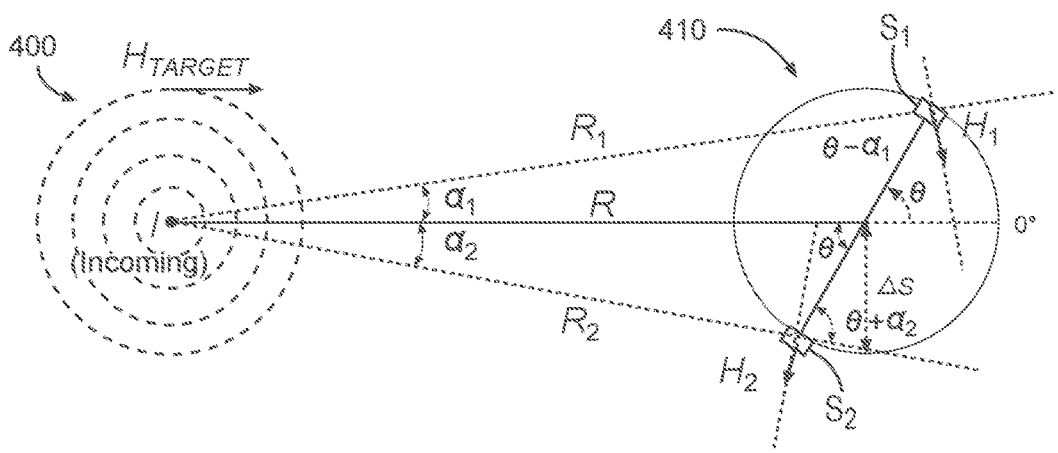

Equation (3) may be designated as the gradient method used to compute ranging distance. In practice, two sensors (e.g., magnetometers) can be used to make magnetic field and gradient field measurements. This is shown in FIG. 4, which illustrates an infinite line source and a logging tool equipped with two sensors S1, S2 for gradient field determination.

A finite difference method is then utilized to calculate the magnetic field strength H and the gradient field strength, given by:

$$\vec{H} = \frac{\vec{H}_1 + \vec{H}_2}{2}, \text{ and} \quad (4a)$$

$$\frac{\partial \vec{H}}{\partial r} = \frac{\vec{H}_1 - \vec{H}_2}{2\Delta S}, \quad (4b)$$

where $H_1$ and $H_2$ are the total field measurements at sensors S1 and S2, respectively. $\Delta S$ is the separation between a sensor and the tool center. Consequently, Equation (3) can be modified based on the finite difference method to compute the ranging distance r, as:

$$r = \left|\frac{\frac{\vec{H}_1 + \vec{H}_2}{2}}{\frac{\vec{H}_1 - \vec{H}_2}{2\Delta S}}\right|. \quad (5)$$

Figure 5:
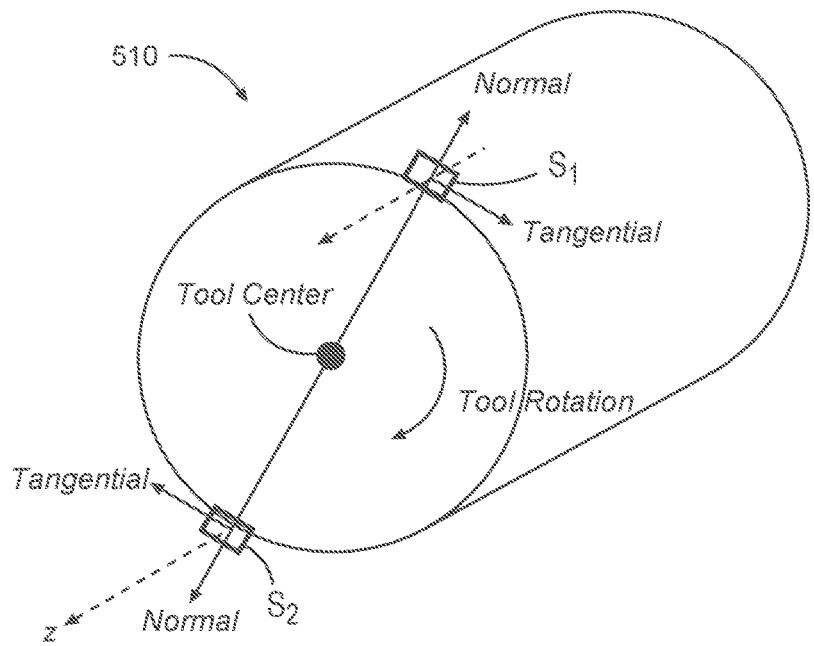

In practice, each sensor measures three orthogonal field components to acquire the total field measurement. The three orthogonal field components are the normal component, the tangential component, and the z component, as shown in FIG. 5. As shown in the figure, the normal component and tangential component are in the same plane as the azimuthal plane of the tool 510, which may be a logging tool. The direction of the tangential component is the tool rotation direction, whereas the normal direction is perpendicular to the tool rotation direction and points away from the tool center; it lies on a straight line between the tool center and the sensor location. The z component direction is parallel to the tool mandrel (i.e., the longitudinal axis of the tool) along with the BHA.

With these definitions, it can be seen that the total field ($H_1$ or $H_2$ in FIG. 4) can be determined by Equation (6), as:

$$\text{Total Field } \vec{H} = \vec{H}_Z + \vec{H}_{Tangential} + \vec{H}_{Normal}. \quad (6)$$

The amplitude of the total field can be calculated by Equation (7), as:

$$|\vec{H}| = \sqrt{|\vec{H}_Z|^2 + |\vec{H}_{Tangential}|^2 + |\vec{H}_{Normal}|^2}. \quad (7)$$

Leakage Current in the Tool Insert

Figure 6:
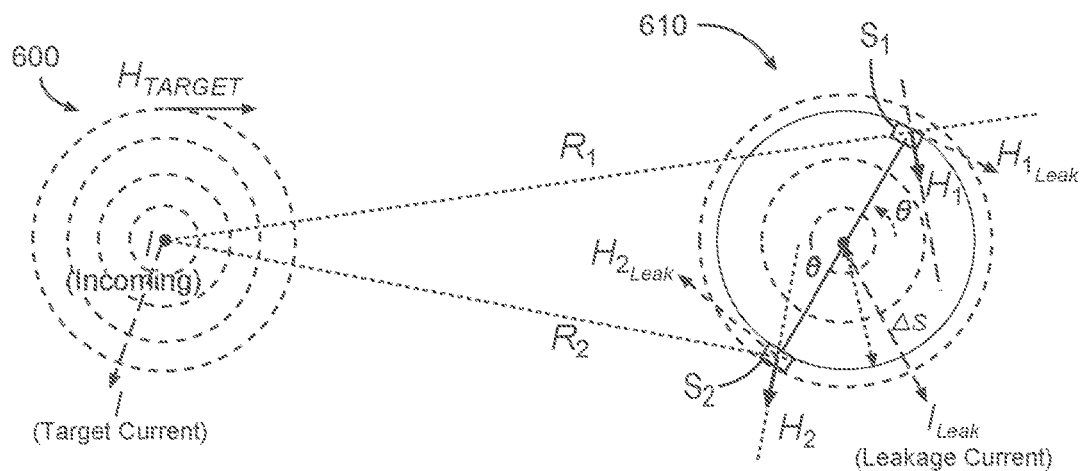

FIG. 6 is a top view of two line sources, one provided by the target current, and the other by the leakage current, in the context of a logging tool 610 equipped with two sensors S1, S2 for gradient field determination. The issue of leakage current flowing in the tool insert introduces an additional current source flowing at the center of the tool 610 between the two sensors S1, S2. Assuming the additional current, that is the leakage current $I_{Leak}$, is uniformly flowing at the tool center, and that the additional tangential field components $H_{1Leak}$ and $H_{2Leak}$ will affect measurements made by the sensors S1 and S2, respectively, it can be seen that the leakage current $I_{Leak}$ can generate interfering signals—disturbing ranging calculations based on total field or tangential component calculations that make use of sensor measurements provided by sensors S1, S2.

On the other hand, the normal component of sensor measurements is not affected by this leakage current, since the field orientation of the normal component is different from the field orientation of the leakage current, and therefore a ranging determination based only on the normal component should have higher ranging accuracy than one using other field components (e.g., tangential or total field).

Determining Insert Current and Reducing Insert Current Measurement Effects

The insert current described above can be calculated based on Ampere's law, given by:

$$\oint_C \vec{H} d\vec{r} = I_S + \int_S \frac{\partial \vec{D}}{\partial t} \cdot \hat{n} dS. \quad (8)$$

Figure 7:
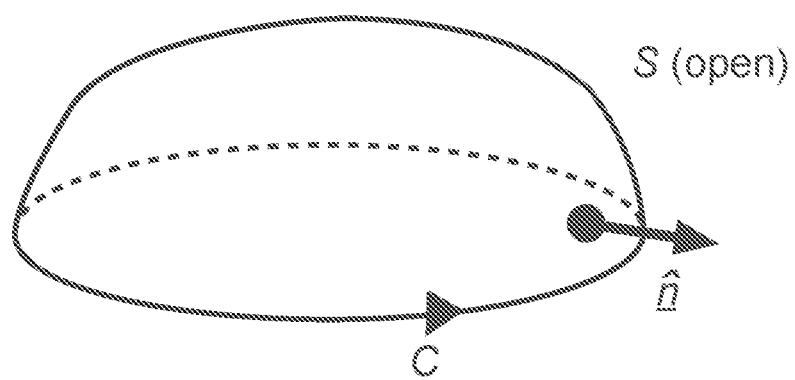

As shown in FIG. 7, following the right-hand rule, the line integral of the magnetic H field around a closed curve $C d\vec{r}$ is an infinitesimal element along the curve C, and equals the current $I_s$ through a surface S.

Since low frequency operation is used in many ranging applications, Equation (8) can often be simplified as:

$$\oint_C \vec{H} d\vec{r} = I_S. \tag{9}$$

Figure 8:
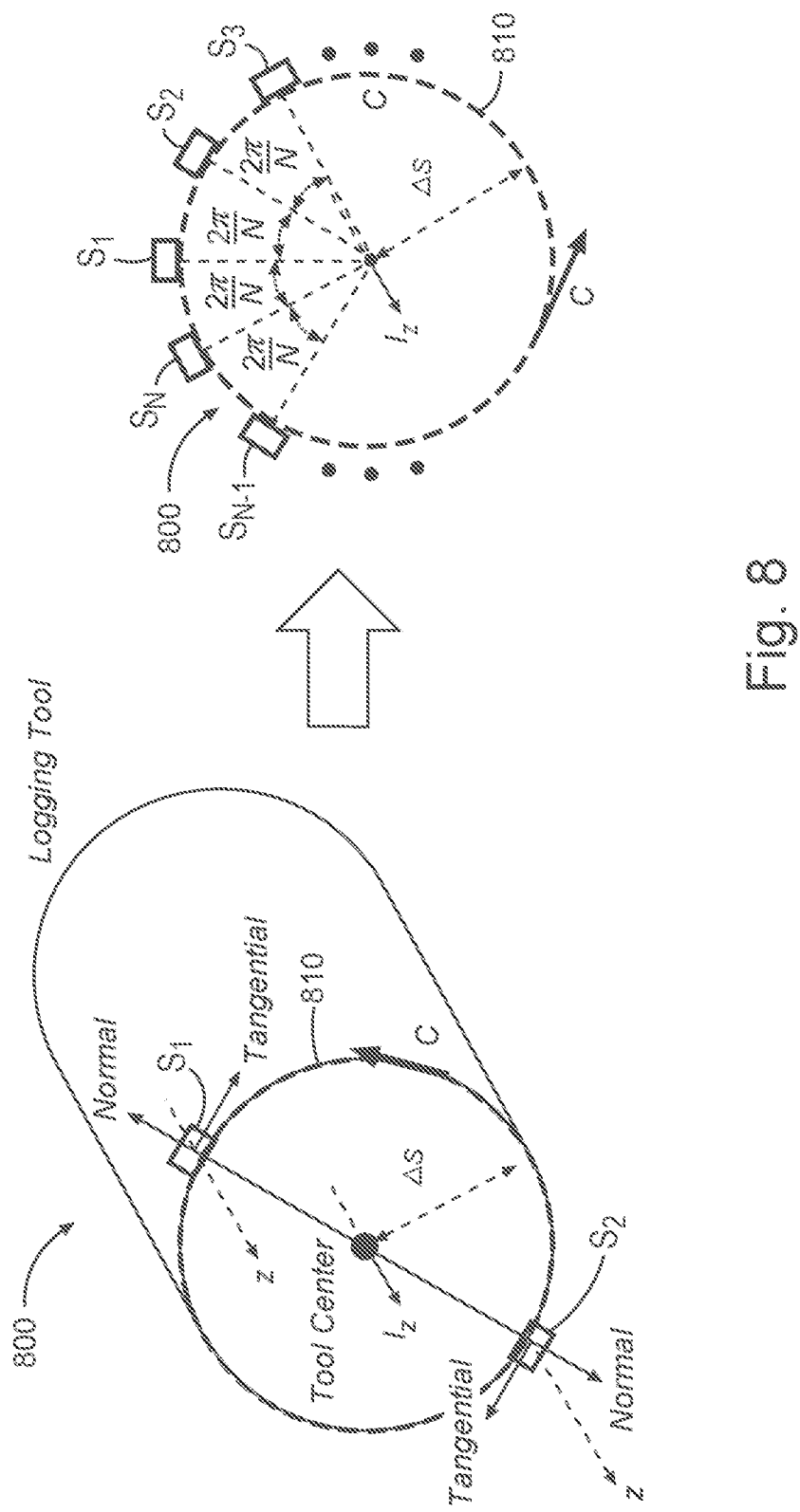

As shown in FIG. 8, which presents perspective and end views of a tool insert 800, to determine the insert current, one can choose the line integral path 810 for the curve C (highlighted as a dashed line in the figure) as the outer circle of the insert 800. Due to the symmetrical structure of the tool insert 800, one can treat the total current I z flowing in the insert cross section surface S as a single line source flowing at the tool center. The insert current flows in the z direction and can be calculated by Equation (9). To carry out the calculation, various sensors located along the path of the curve C can be used to measure the tangential component at each sensor location.

For simplicity, N sensors can be installed and equally spaced at different tool azimuth locations along the path of the curve C. Therefore, the tangential component of measurements made by each sensor S1, S2, S3, . . . , $S_{N-1}$, $S_N$ in FIG. 8 can be utilized to estimate the insert current, based on Equation (9), as:

$$I_Z = \oint_C \vec{H} d\vec{r} \approx \sum_{i=1}^{N} H_{tangential}(i) \times (2\pi \Delta S) \times \frac{2\pi}{N}, \tag{10}$$

wherein $H_{tangential}(i)$ is the tangential component measurement at sensor i in the figure, for i=1 to N.

Once the insert current $I_z$ (or $I_{Leak}$ in FIG. 6) is determined by Equation (10), the field $H_{1Leak}$ and $H_{2Leak}$ in FIG. 6 can be expressed as:

$$H_{1_{Leak}} = H_{2_{Leak}} = \frac{I_Z}{2\pi \Delta S}. \tag{11}$$

Thus, the field strength $\vec{H}_{Target}$ (i.e., $H_1$ or $H_2$ in FIG. 6) due to target well current (I in FIG. 4) can be determined by $$\vec{H}_{Target} = \vec{H}_{Total} - \vec{H}_{Leakage}, \tag{12}$$

where $\vec{H}_{Total}$ indicates total field measurement (including tangential, normal and z components) at each sensor, and $\vec{H}_{Leakage}$ is the field strength due to insert current ($H_{1_{Leak}}$ and $H_{2_{Leak}}$ in FIG. 6) that is calculated by Equation (11). Here wherein $\vec{H}_{Target}$ comprises a corrected field measurement that can be used to determine the range between two wells, as follows.

Equation (12) denotes a directional vector for each field, whereas the total field direction can be calculated based on all three component measurements (tangential, normal, and z) and the leakage field strength is in the tangential direction of each sensor location. Therefore, the field direction for $\vec{H}_{Target}$ can be determined based on Equation (12), after which the ranging distance to the target well using the measurements provided by two sensors ($\vec{H}_{Target}$ at sensors S1, S2 in FIG. 6) can be made, benefiting from a reduced insert current effect on the ranging calculations.

It is noted that installing a greater number of reference sensors (measuring the tangential component) in the tool insert should increase the accuracy that will be realized with respect to insert current calculation using Equation (11). That is, the integral approximation will be more accurate when more sensors are used. At least two sensors S1, S2 should be used for calculations with Equation (11). However, instead of installing multiple sensors to provide the input measurement data for Equation (11), a field operator can rotate the tool 800 with one sensor S1 to a variety of tool azimuth locations, perhaps separated by a distance of $2\pi/N$ radians, where N is the number of locations, and then use the sensor S1 to take measurements at each of the different azimuthal angles around the insert outer circle path 810. These azimuthal measurements can thereafter be used to provide the data for use with Equation (11), without installing multiple sensors in the tool.

It is also noted that the sensors (S1, . . . SN) shown in FIG. 8, with many embodiments using at least three sensors, do not necessarily have to be equally spaced in the azimuthal direction. If the sensors are not equally spaced around the azimuthal direction, Equation (10) can be modified as shown here:

$$I_Z = \oint_C \vec{H} d\vec{r} \approx \sum_{i=1}^{N} H_{tangential}(i) \times (2\pi \Delta S) \times \beta_i. \tag{13}$$

In this case, $\beta_i$ can be expressed as:

$$\beta_i = |\alpha_i - \alpha_{i-1}| \text{ and} \tag{14a}$$

$$\beta_i = |\alpha_{i+1} - \alpha_i|, \text{ or} \tag{14b}$$

$$\beta_i = \frac{|\alpha_i - \alpha_{i-1}| + |\alpha_{i+1} - \alpha_i|}{2}, \tag{14c}$$

where $\alpha_i$ is the tool azimuth angle for sensor i, as i varies from 1 to N. The range adjustment module RA shown in FIG. 2 can be used to make the adjustments to the ranging sensor measurements, according to the reference sensor data.

Figure 9:
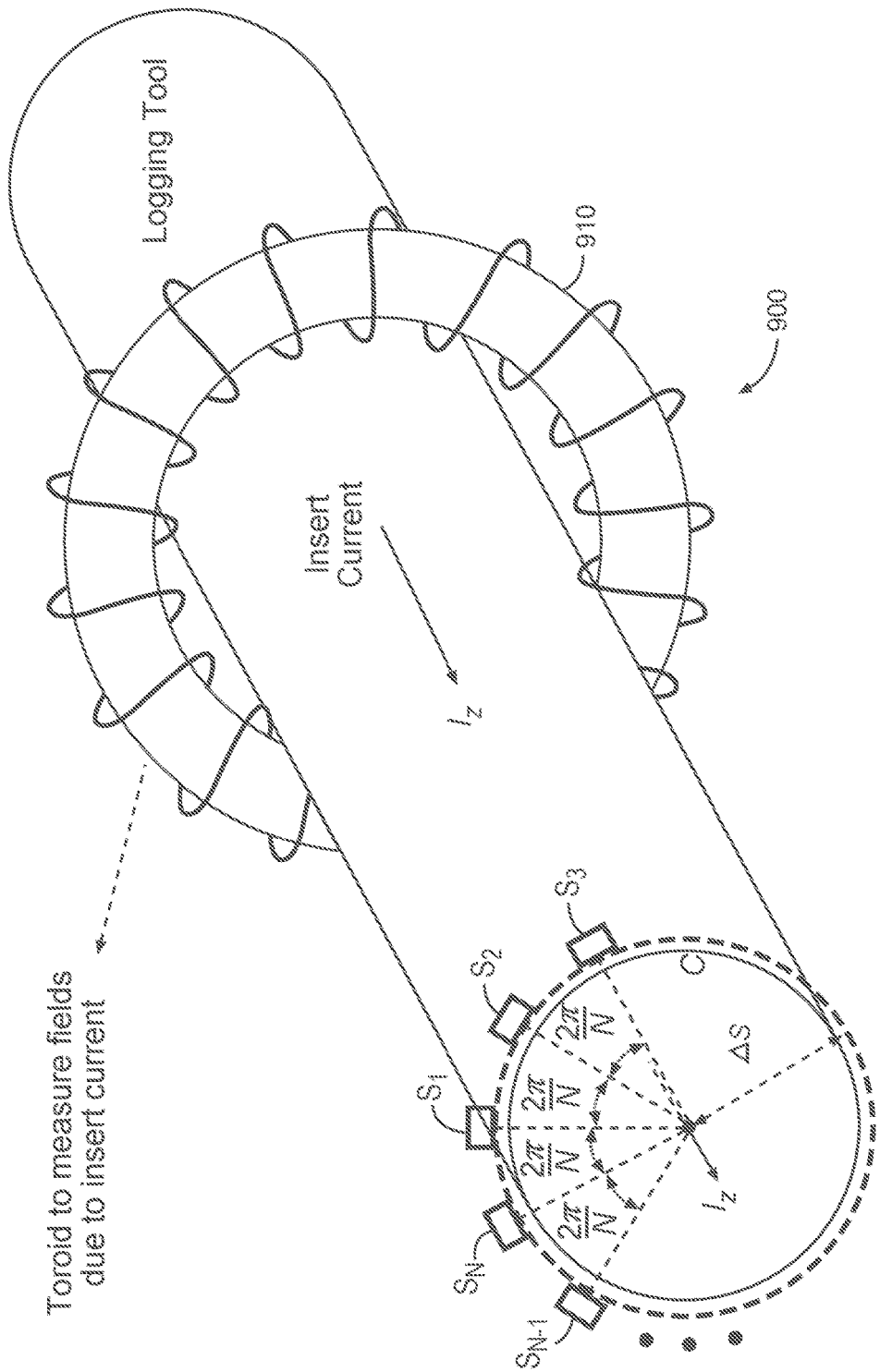

For an explanation of the second set of embodiments mentioned previously, it is noted that a reference electromagnetic field strength sensor can be used to determine the magnitude of the insert current $I_z$ in Equation (13). Thus, as shown in FIG. 9, a reference electromagnetic field strength sensor 910, such as a toroidal antenna, can be mounted on a down hole housing 900 (e.g., on a wireline sonde 1410 in FIG. 14, or on a logging tool forming part of the bottom hole assembly 1526 in FIG. 15 of a drill string) proximate to the ranging electromagnetic field strength sensors S1 . . . SN, as shown in FIG. 9, or underneath the ranging electromagnetic field strength sensors S1 . . . SN, at the location of the dashed line 920. The reference electromagnetic field strength sensor 910 can be used to directly determine the magnitude of the magnetic B field ($B_{insert}$) due to the insert current. It should be noted that the reference electromagnetic field strength sensor 910 can be any one of a number of shapes, including circular, square, multi-sided (e.g., triangular, hexagonal, etc.)—as long as the reference electromagnetic field strength sensor 910 provides a closed loop current path around the tool housing 900.

For example, if a toroidal antenna is used as the reference electromagnetic field strength sensor 910, the magnitude of the distorting field strength $B_{insert}$ due to the insert current I (i.e., the distorting field strength measurement) can be obtained by measuring the voltage in the toroid, combined with the knowledge of the number of turns (M) around the circumference of the toroid. Thus, the insert current $I_z$ is proportional to the voltage received by the toroid $V_{Toroid}$=j$\omega B_{insert}$MA according to Equations (15) and (16), as follows:

$$B_{insert} = V_{Toroid} / (j\omega MA), \text{ and} \quad (15)$$

$$I_z = \oint_C \vec{H} d\vec{r} = \frac{B_{insert}}{\mu} \times 2\pi L = \frac{V_{Toroid}(2\pi L)}{j\omega \mu MA} \quad (16)$$

where L is the radius of the toroid, μ is the magnetic permeability of the toroid, and A is the area of each of the M-loops of the toroid. After the field strength $B_{insert}$ due to the insert current has been measured, the measurements provided by the ranging electromagnetic field strength sensors can be calibrated according to Equations (15) and (16).

Figure 10:
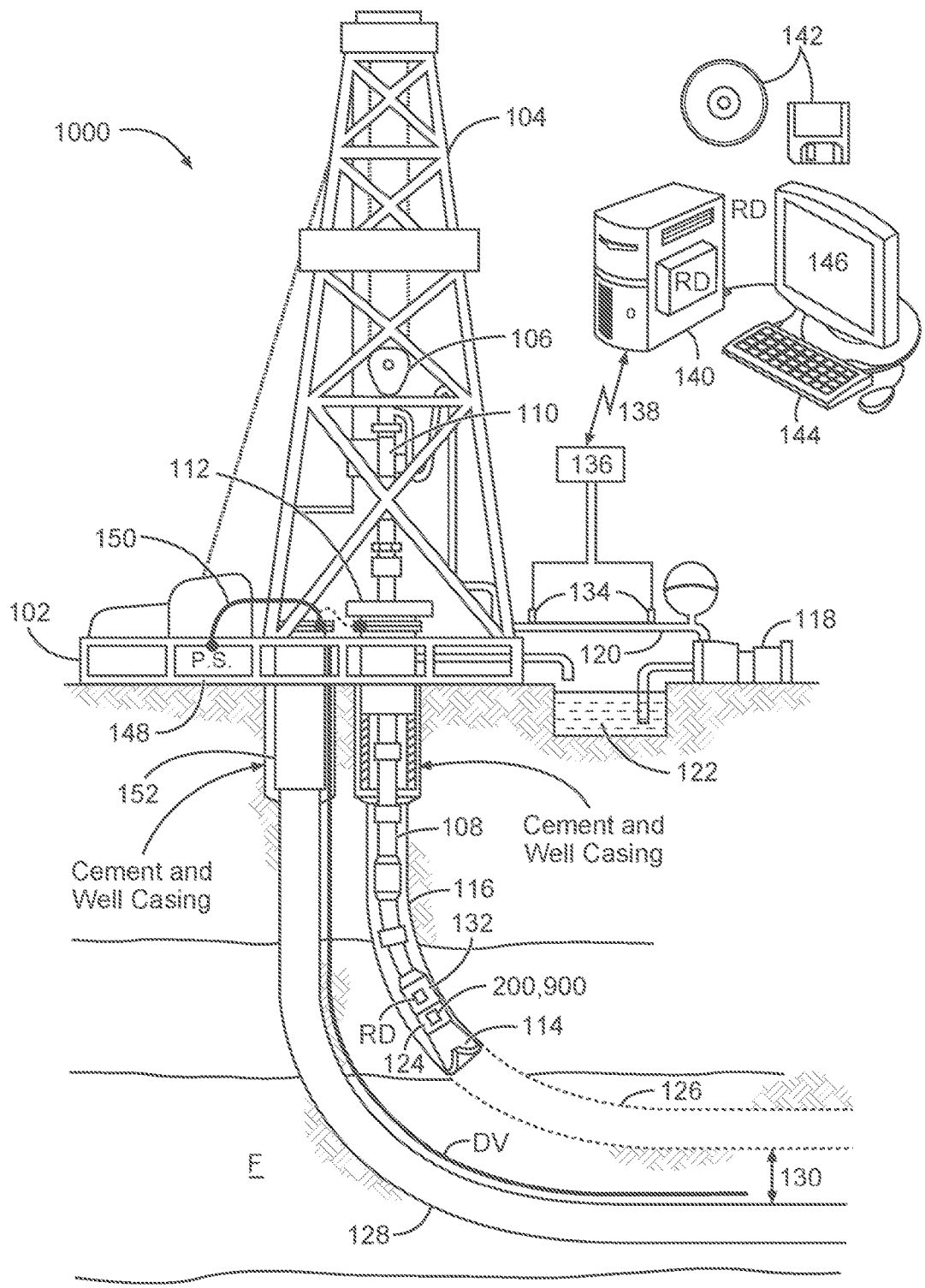
FIG. 10 depicts an example drilling environment in which ranging embodiments may be employed.

FIG. 10 depicts an example drilling environment 1000 in which ranging embodiments may be employed. In some embodiments, an apparatus comprises a down hole housing (e.g., ranging tool 124) attached to a ranging electromagnetic field strength sensor, such as one or more of the sensors S1, S2. The ranging electromagnetic field strength sensor can be operated to measure electromagnetic field strength components associated with an electromagnetic field originated by a current source (e.g, the power supply P.S.), via direct transmission or backscatter transmission, when the housing is disposed in the drilling well 126, to provide ranging measurements for calculating an approximate range 130 between the target well 128 and the drilling well 126, and a reference electromagnetic field strength sensor (e.g., as part of apparatus 200) attached in a closed loop path around the housing, to provide distorting field strength measurements. A system may include the apparatus shown in FIG. 10, as well as a current source to couple current to the target well or a the drilling well.

In some embodiments, a down hole housing (e.g., the ranging tool 124) is attached to a ranging electromagnetic field strength sensor, such as one or more of the sensors S1, S2, the electromagnetic field strength sensor(s) to measure electromagnetic field strength components associated with an electromagnetic field originating at a first well (e.g., a target well 128), via direct transmission or backscatter transmission, when the housing is disposed in a second well (e.g., a drilling well 126), to provide ranging measurements for calculating an approximate range between the first well and the second well. The apparatus may further comprise a reference electromagnetic field strength sensor (e.g., perhaps comprising one or more sensors RS3 . . . RS6 of FIG. 2) providing a closed loop current path around the housing, to provide distorting field strength measurements.

When it is known ahead of time that a particular well will be used as a ranging target (e.g., the target well 128), a device DV can be permanently installed along with or in that well as part of the well completion process, before production begins. The device DV may use electromagnetic waves in a variety of ways. For example, the device DV may comprise a conductor or an insulated conductor, such as a piece of wire or cable, or a coaxial cable, embedded in the well casing. The device DV may include a solenoid or switch connected to a source of power, to receive an electrical signal, to apply the power to the conductor, and by that action, to produce a magnetic field originating from the ranging target well that can be measured by sensors (e.g., magnetometers) in a drilling well. In some embodiments, the device DV may comprise a waveguide to receive energy through the target well casing. The device DV may comprise a capacitor or inductor to capture an electrical field (voltage difference) that can in turn be measured remotely, at the drilling well.

In some embodiments an apparatus comprises a range determination module RD (see FIGS. 1, 10, and 14-15) to receive the ranging measurements from the ranging electromagnetic field strength sensors S1 . . . SN and distorting field strength measurements from a reference electromagnetic field strength sensor, such as a toroidal antenna, shown in FIG. 9. The range determination module RD may comprise a processing unit programmed to implement any of the calculations shown as part of the equations in this document, to provide adjusted values of the ranging measurements to calculate the approximate range to the target well.

It should be noted that when the insert current sensor (i.e., the reference electromagnetic field strength sensor) is used to receive the distributed magnetic field, a single ranging electromagnetic field strength sensor can be employed to determine the range to the target well. That is, while a single ranging sensor is normally unable to provide the gradient field for ranging distance calculations, the combination of the single ranging sensor and the insert current sensor enable dual measurements of the ranging signal provided by the target well—so that in some embodiments a single ranging sensor, plus the insert current sensor, are sufficient to provide the desired ranging distance determination.

Figure 11:
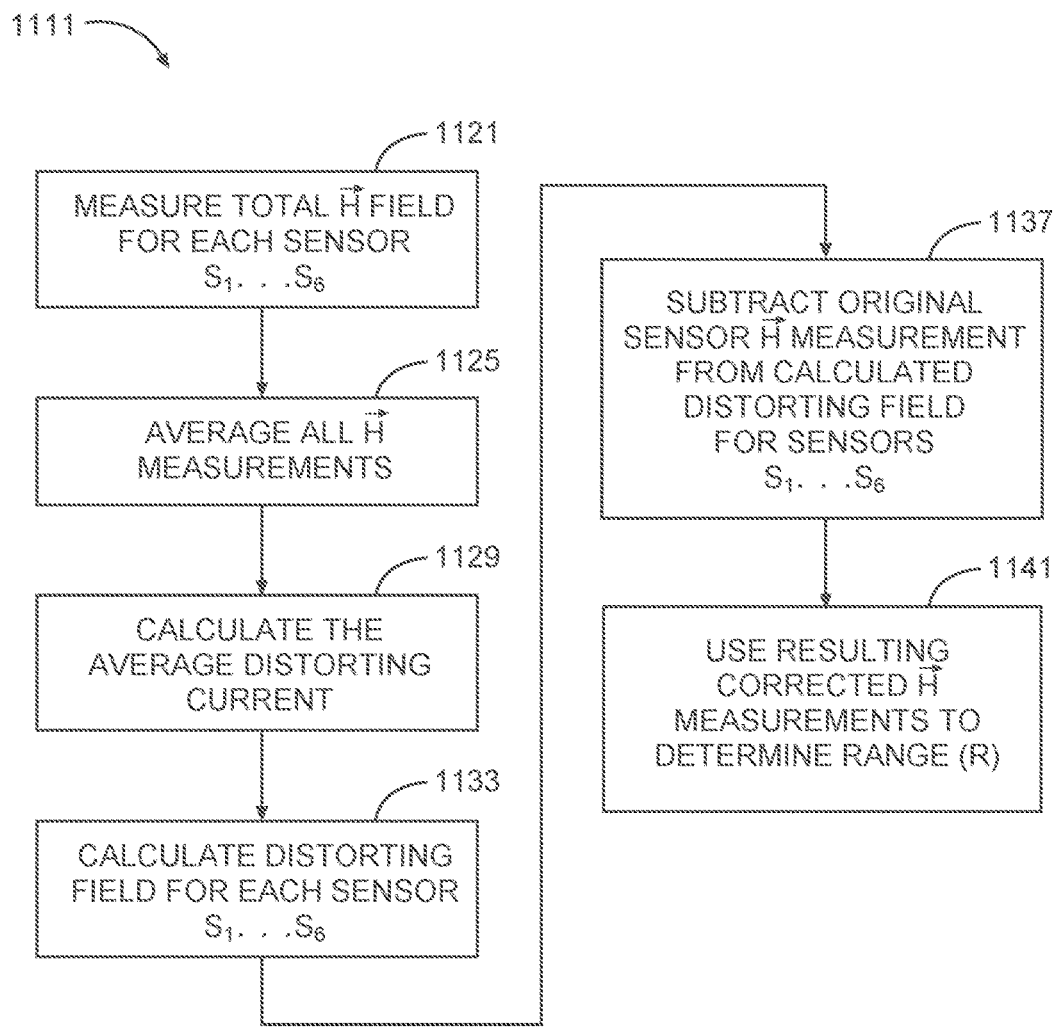
FIGS. 11 to 13 are flow diagrams of well ranging methods, according to various embodiments.
Figure 12:
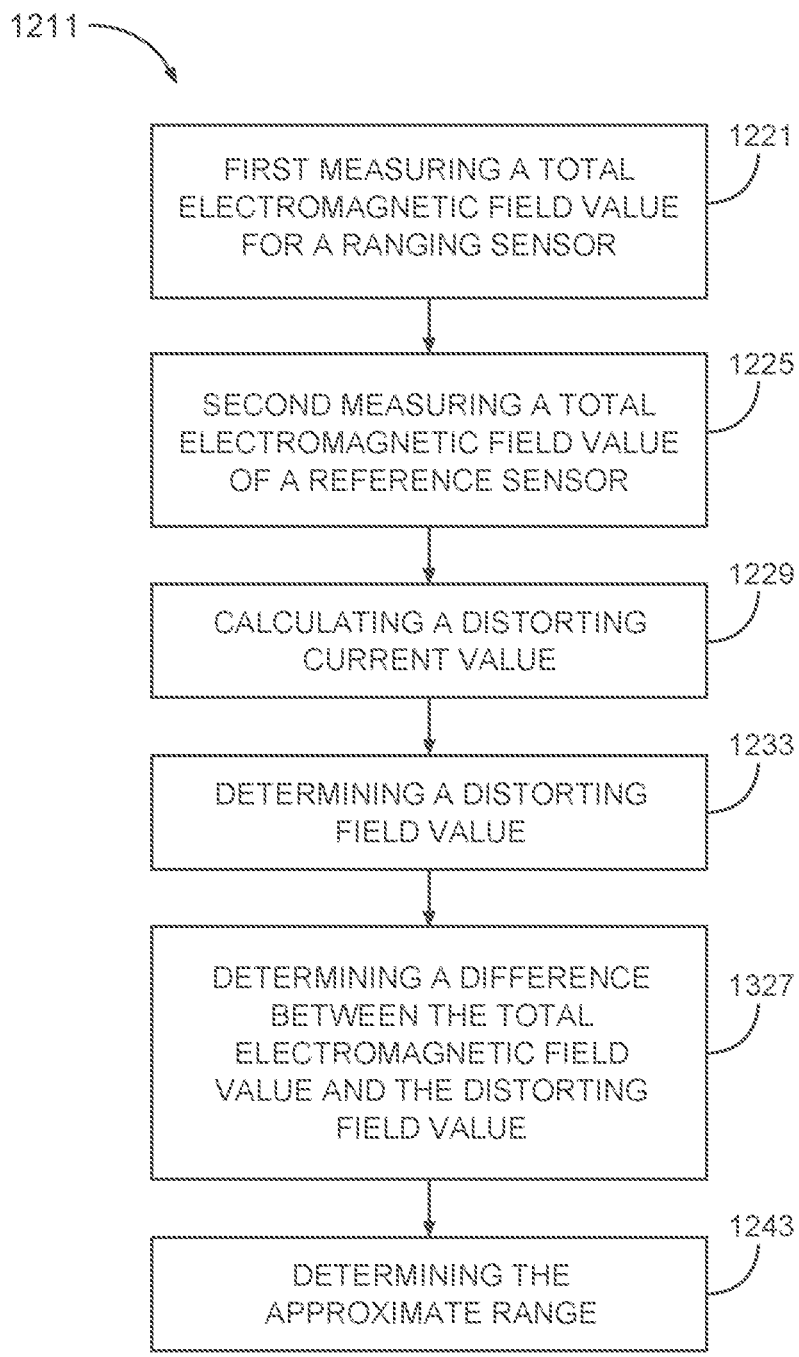
Figure 13:
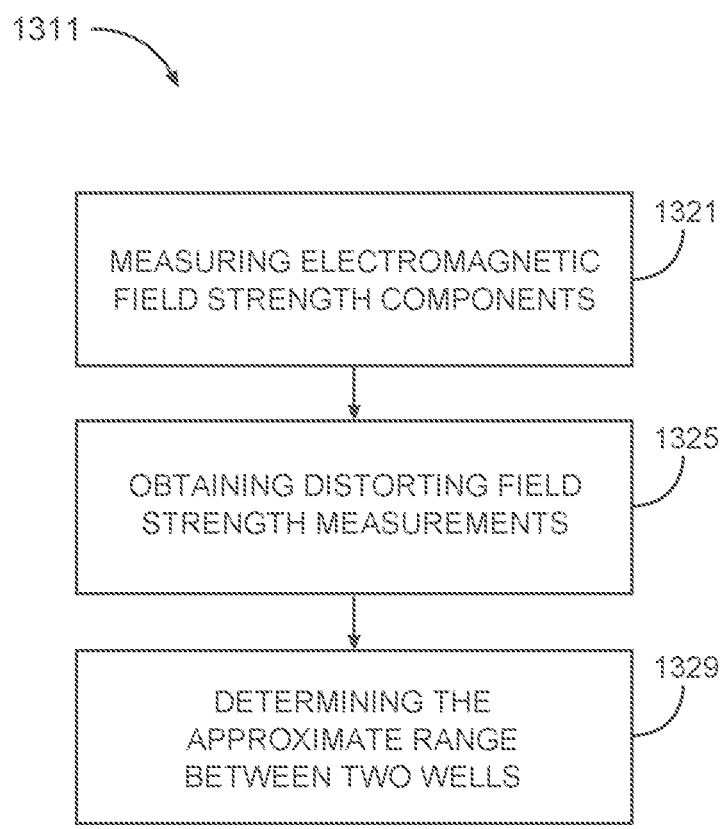

FIGS. 11 to 13 are flow diagrams of well ranging methods 1111, 1211, 1311 according to various embodiments. Referring now to FIG. 11, a method of range determination between wells, using ranging sensor measurements adjusted according to reference sensor measurements, can be seen.

At block 1121, the method 1111 comprises measuring electromagnetic field strength components associated with an electromagnetic field originating at a first well, via direct transmission or backscatter transmission, using at least two ranging electromagnetic field strength sensors attached to a housing, to provide ranging measurements. The total H field can be measured for each sensor.

In some embodiments, the measurements of the H field made at block 1121 are designated as distorting field strength measurements. That is, the activity at block 1121 may further comprise obtaining distorting field strength measurements using a set of at least three reference electromagnetic field strength sensors attached in a circular path around the housing.

In some embodiments, the H field measurements obtained at block 1121 are averaged, at block 1125.

In blocks 1133, 1137, and 1141, the method 1111 may comprise determining the approximate range between the first well and a second well in which the ranging electromagnetic field strength sensors are disposed, based on the ranging measurements and the distorting field strength measurements. This may occur by way of: calculating the distorting field for each of the sensors at block 1133, subtracting the original sensor H field measurement (made at block 1121) form the calculated distorting field for each sensor at block 1137, and then using the corrected H field measurements to determine the range between the wells at block 1141. The approximate range may be determined according to the formula $\vec{H}_{Target} = \vec{H}_{Total} - \vec{H}_{Leakage}$. In this case, the set of reference electromagnetic field strength sensors may be attached in a circular path around the housing, to include the two ranging electromagnetic field strength sensors.

In FIG. 12, another ranging method 1211 embodiment is illustrated. Here the method 1211 begins at block 1221 with first measuring a total electromagnetic field value for a ranging sensor disposed in a second well, wherein a signal to be measured originates at a first well, and the first measuring occurs in the second well.

In some embodiments, the method 1211 continues on to block 1225 to include second measuring a total electromagnetic field value of a reference sensor attached in a closed loop around a housing wherein the ranging sensor and the reference sensor are located on the same housing.

In some embodiments, the method 1211 continues on to block 1229 to include calculating a distorting current value based on the total electromagnetic field value of the reference sensor.

In some embodiments, the method 1211 continues on to block 1233 to include determining a distorting field value for the ranging sensor based on the calculated distorting current value of the reference device In some embodiments, the method 1211 continues on to block 1237 to include determining a difference between the total electromagnetic field value measured by the ranging sensor and the distorting field value determined by the reference device, to provide a corrected electromagnetic field value measurement.

In some embodiments, the method 1211 continues on to block 1243 to include determining an approximate range between the first well and the second well using the corrected electromagnetic field value measurement.

In FIG. 13, another ranging method 1311 embodiment is illustrated. Here the method 1311 begins at block 1321 with measuring electromagnetic field strength components associated with an electromagnetic field originating at a first well, via direct transmission or backscatter transmission, using at least one ranging electromagnetic field strength sensor attached to a housing, to provide ranging measurements In some embodiments, the method 1311 continues on to block 1325 to include obtaining distorting field strength measurements using a reference electromagnetic field strength sensor attached in a closed loop path around the housing.

In some embodiments, the method 1311 continues on to block 1329 to include determining an approximate range between the first well and a second well in which the ranging electromagnetic field strength sensors are disposed, based on the ranging measurements and the distorting field strength measurements.

ADDITIONAL DETAILED DESCRIPTION AND SOME REPRESENTATIVE EMBODIMENTS

Figure 14:
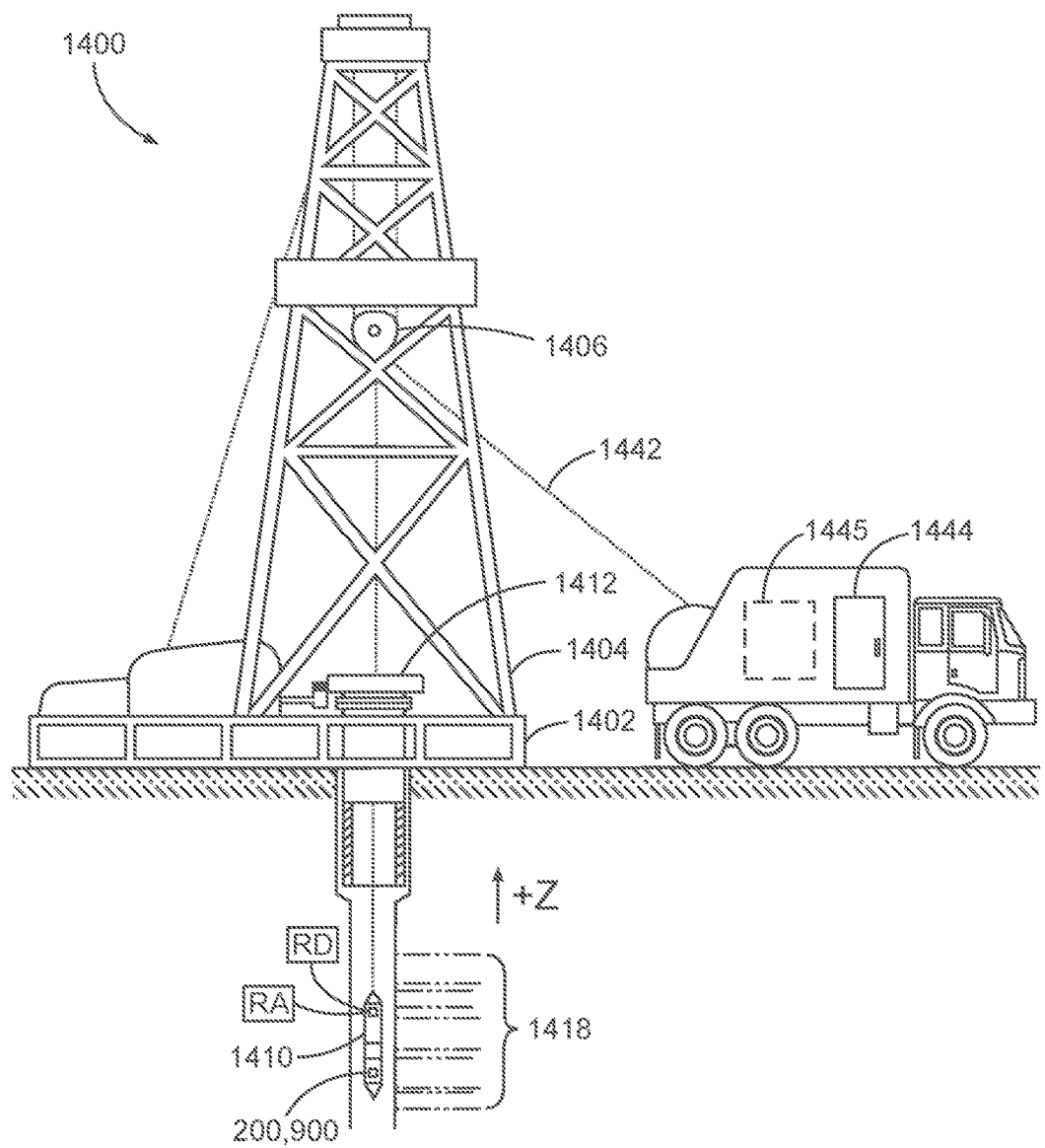
FIG. 14 is a block diagram of a wireline system implementation of various embodiments.

FIG. 14 is a block diagram of a wireline system 1400 implementation of various embodiments. The system 1400 of FIG. 14 may include any of the embodiments of receiver or sensor mounting discussed previously. In this case, a hoist 1406 may be included as a portion of a platform 1402, such as might be coupled to a derrick 1404, and used to raise or lower equipment such as a wireline sonde 1410 into or out of a borehole. The wireline sonde 1410 may include any one or more of the above-described embodiments, including sensors (e.g., shown as apparatus 200 and 910) and a range determination module RD, and/or range adjustment module RA.

In this wireline example, a cable 1442 may provide a communicative coupling between a logging facility 1444 (e.g., including a processor circuit 1445 including memory or other storage or control circuitry) and the sonde 1410. In this manner, information about the formation 1418 may be obtained. The processor circuit 1445 can be configured to access and execute instructions stored in a memory to implement any of the methods described herein (e.g., by accessing a range determination module RD or range adjustment module RA).

Figure 15:
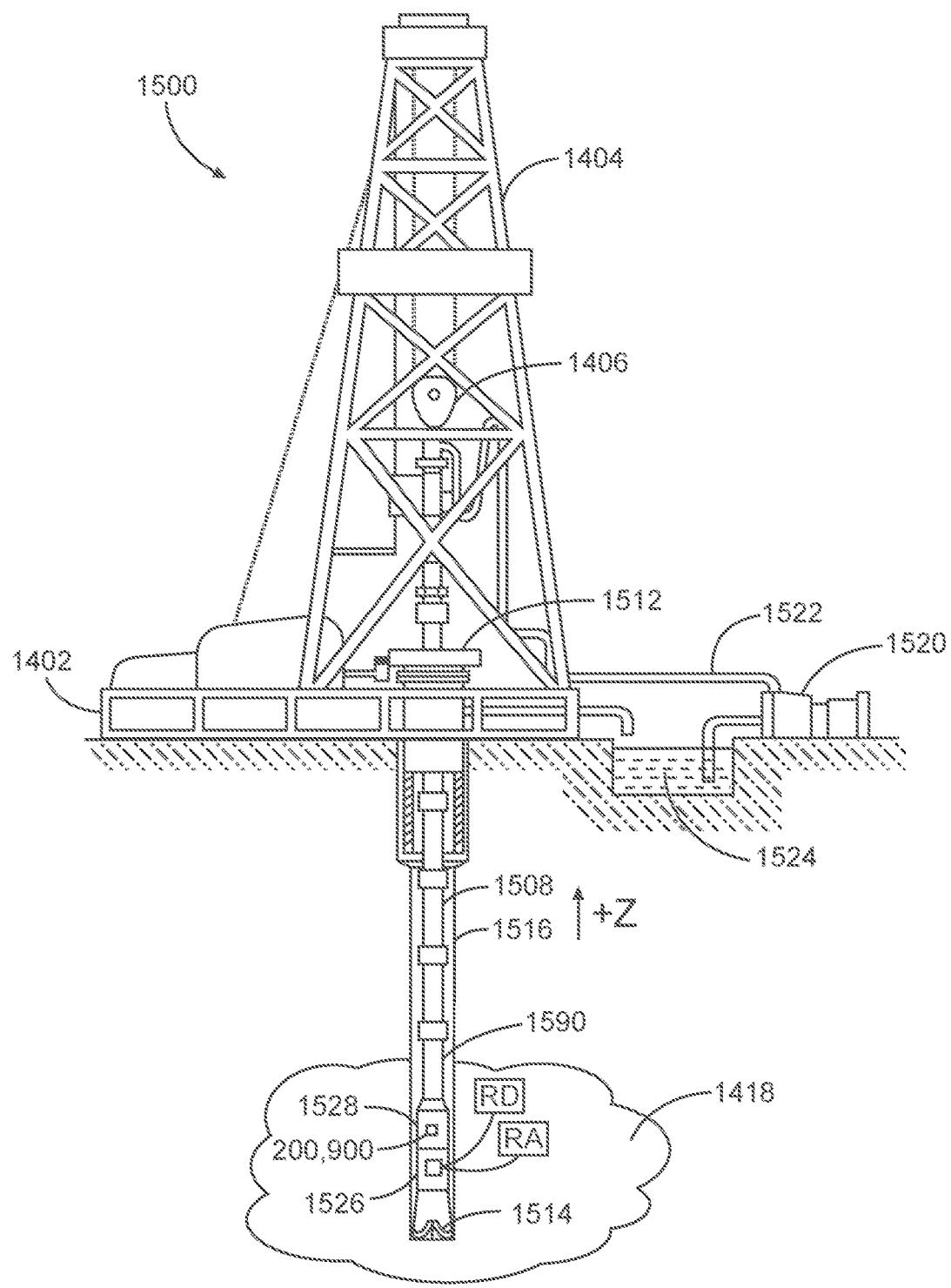
FIG. 15 is a block diagram of a drilling system implementation of various embodiments.

FIG. 15 is a block diagram of a drilling system 1500 implementation of various embodiments. This diagram shows a drilling rig system 1500 according to various embodiments that may include measurement while drilling (MWD) or logging while drilling (LWD) capability. The drilling apparatus can use data from an insert in the drill string 1508, having attached to a number of receivers or sensors (e.g., shown as apparatus 200 and 910) as discussed previously, and using acquired and calculated ranging information to steer the drill bit 1514.

A drilling rig or platform 1402 generally includes a derrick 1404 or other supporting structure, such as including or coupled to a hoist 1406. The hoist 1406 may be used for raising or lowering equipment or other apparatus such as drill string 1508. The drill string 1508 may access a borehole 1516, such as through a well head 1412. The lower end of the drill string 1508 may include various apparatus, such as a drill bit 1514, such as to provide the borehole 1516.

A drilling fluid or "mud" may be circulated in the annular region around the drill bit 1514 or elsewhere, such as provided to the borehole 1516 through a supply pipe 1522, circulated by a pump 1520, and returning to the surface to be captured in a retention pit 1524 or sump. Various subs or tool assemblies may be located along the drill string 1508, such as a bottom hole assembly (BHA) 1526 or a second sub 1528. The BHA 1526 and/or the sub 1528 may include one or more sensors or receivers (e.g., shown as apparatus 200 and 910), as described herein, along with a current source to initiate a ranging signal, and a processor with access to a memory that contains a program to implement any of the methods described herein (e.g., a ranging determination module RD, and/or a ranging adjustment module RA).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or 10, or some other form of a data processing device 140, to implement portions of a method of the present disclosure, for example the processes and methods described in FIGS. 11-13 (e.g., for computer-assisted well completion).

Though sometimes described serially in the examples of FIG. 11-13, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules.

Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized.

Similarly, while some of the above-described embodiments may show only one receiver, perhaps in the form of a magnetometer, coil, or telemetry receiver, one of ordinary skill in the art would realize that a drill string or downhole tool may include multiple receivers for making the various measurements described herein. Examples of various embodiments will now be listed in a non-limiting fashion.

In some embodiments, a method comprises measuring electromagnetic field strength components associated with an electromagnetic field originating at a first well, via direct transmission or backscatter transmission, using two ranging electromagnetic field strength sensors attached to a housing, to provide ranging measurements.

In some embodiments, the method comprises obtaining distorting field strength measurements using a set of at least three reference electromagnetic field strength sensors attached in a circular path around the housing.

In some embodiments, the method comprises determining the approximate range between the first well and a second well in which the ranging electromagnetic field strength sensors are disposed, based on the ranging measurements and the distorting field strength measurements.

In some embodiments, the approximate range is determined according to the formula $\vec{H}_{Target} = \vec{H}_{Total} - \vec{H}_{Leakage}$, where $\vec{H}_{Total}$ comprises a total field measurement at each sensor, wherein $\vec{H}_{Leakage}$ comprises a field strength due to an insert current, and wherein $\vec{H}_{Target}$ comprises a corrected field measurement.

In some embodiments, the set of reference electromagnetic field strength sensors attached in the circular path around the housing includes the two ranging electromagnetic field strength sensors.

In some embodiments, a method comprises measuring a total electromagnetic field value for each one of a set of ranging sensors disposed in a second well, wherein a signal to be measured originates at a first well, and the measuring occurs in the second well.

In some embodiments, the method comprises averaging the total electromagnetic field value over all of the ranging sensors to provide an average total field value.

In some embodiments, the method comprises calculating an average distorting current value based on the average total field value.

In some embodiments, the method comprises determining an average distorting field value based on the average distorting current value.

In some embodiments, the method comprises determining a difference between the total electromagnetic field value measured by each of the ranging sensors and the average distorting field value, to provide corrected electromagnetic field value measurements.

In some embodiments, the method comprises determining an approximate range between the first well and the second well using the corrected electromagnetic field value measurements.

In some embodiments, a method comprises first measuring a total electromagnetic field value for a ranging sensor disposed in a second well, wherein a signal to be measured originates at a first well, and the first measuring occurs in the second well.

In some embodiments, the method comprises second measuring a total electromagnetic field value of a reference sensor attached in a closed loop around a housing wherein the ranging sensor and the reference sensor are located on the same housing.

In some embodiments, the method comprises calculating a distorting current value as a calculated distorting current value, based on the total electromagnetic field value of the reference sensor.

In some embodiments, the method comprises determining a distorting field value for the ranging sensor based on the calculated distorting current value.

In some embodiments, the method comprises determining a difference between the total electromagnetic field value measured by the ranging sensor and the distorting field value, to provide a corrected electromagnetic field value measurement.

In some embodiments, the method comprises determining an approximate range between the first well and the second well using the corrected electromagnetic field value measurement.

In some embodiments, a method comprises measuring electromagnetic field strength components associated with an electromagnetic field originating at a first well, via direct transmission or backscatter transmission, using at least one ranging electromagnetic field strength sensor attached to a housing, to provide ranging measurements.

In some embodiments, the method comprises obtaining distorting field strength measurements using a reference electromagnetic field strength sensor attached in a closed loop path around the housing.

In some embodiments, the method comprises determining an approximate range between the first well and a second well in which the ranging electromagnetic field strength sensors are disposed, based on the ranging measurements and the distorting field strength measurements.

In some embodiments, as shown in FIGS. 1-10 and 14-15, an apparatus comprises a down hole tool housing attached to at least two ranging electromagnetic field strength sensors, each of the electromagnetic field strength sensors to measure electromagnetic field strength components associated with an electromagnetic field originating at a first well, via direct transmission or backscatter transmission, when the housing is disposed in a second well, to provide ranging measurements for calculating an approximate range between the first well and the second well. In some embodiments, the apparatus comprises a set of at least three reference electromagnetic field strength sensors attached in a circular path around the housing, to provide distorting field strength measurements.

In some embodiments, the ranging electromagnetic field strength sensors and the reference electromagnetic field strength sensors are spaced apart from each other in an azimuthal direction, and located at approximately a same radial distance from a longitudinal centerline of the housing. In some embodiments, the ranging electromagnetic field strength sensors are spaced substantially equally apart from each other in an azimuthal direction.

In some embodiments, the reference electromagnetic field strength sensors are spaced substantially equally apart from each other along the circular path. In some embodiments, the set of reference electromagnetic field strength sensors includes the two ranging electromagnetic field strength sensors.

In some embodiments, an apparatus comprises a down hole tool housing attached to a ranging electromagnetic field strength sensor, the ranging electromagnetic field strength sensor to measure electromagnetic field strength components associated with an electromagnetic field originating at a first well, via direct transmission or backscatter transmission, when the housing is disposed in a second well, to provide ranging measurements for calculating an approximate range between the first well and the second well.

In some embodiments, the apparatus comprises a reference electromagnetic field strength sensor providing a closed loop current path around the housing, to provide distorting field strength measurements.

In some embodiments, the reference electromagnetic field strength sensor comprises a toroidal antenna. In some embodiments, the reference electromagnetic field strength sensor is attached to the ranging electromagnetic field strength sensor, or to the housing.

In some embodiments, as shown in FIGS. 1-10 and 14-15, a system comprises a current source to couple current to a target well or a drilling well. The system may further comprise an apparatus, the apparatus comprising a down hole tool housing attached to two ranging electromagnetic field strength sensors. Each of the electromagnetic field strength sensors may operate to measure electromagnetic field strength components associated with an electromagnetic field originated by the current source, via direct transmission or backscatter transmission, when the housing is disposed in the drilling well, to provide ranging measurements for calculating an approximate range between the target well and the drilling well. The system may further comprise a set of at least three electromagnetic field strength sensors attached in a circular path around the housing, to provide distorting field strength measurements.

In some embodiments, the system comprises a range adjustment module to receive the ranging measurements and the distorting field strength measurements, and to provide adjusted values of the ranging measurements to calculate the approximate range. In some embodiments, the set of reference electromagnetic field strength sensors attached in the circular path around the housing includes the two ranging electromagnetic field strength sensors.

In some embodiments, a system comprises a current source to couple current to a target well or a drilling well, as well as an apparatus comprising a down hole tool housing attached to a ranging electromagnetic field strength sensor, the ranging electromagnetic field strength sensor to measure electromagnetic field strength components associated with an electromagnetic field originated by the current source, via direct transmission or backscatter transmission, when the housing is disposed in the drilling well, to provide ranging measurements for calculating an approximate range between the target well and the drilling well. The system may further comprise a reference electromagnetic field strength sensor attached in a closed loop path around the housing, to provide distorting field strength measurements.

In some embodiments, the reference electromagnetic field strength sensor is used to measure the electromagnetic field strength components associated with the electromagnetic field originating at the first well, via the direct transmission or the backscatter transmission, in conjunction with the ranging electromagnetic field strength sensor.

In some embodiments, the system comprises a range determination module to receive the ranging measurements and the distorting field strength measurements, and to provide adjusted values of the ranging measurements to calculate the approximate range.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 14). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus comprising:
a down hole tool housing attached to a ranging electromagnetic field strength sensor, the ranging electromagnetic field strength sensor to measure electromagnetic field strength components associated with an electromagnetic field originating at a first well, via at least one of direct transmission and backscatter transmission, when the down hole tool housing is disposed in a second well, to provide ranging measurements to calculate an approximate range between the first well and the second well; and
a reference electromagnetic field strength sensor to provide a closed loop current path around the down hole tool housing, to provide distorting field strength measurements;
wherein the ranging measurements are adjusted based, at least in part, on the distorting field strength measurements.

2. The apparatus of claim 1, wherein the reference electromagnetic field strength sensor comprises a toroidal antenna.

3. The apparatus of claim 1, wherein the reference electromagnetic field strength sensor is attached to at least one of the ranging electromagnetic field strength sensor and the down hole tool housing.

4. The apparatus of claim 1, wherein the reference electromagnetic field strength sensor is disposed underneath the ranging electromagnetic field strength sensor.

5. The apparatus of claim 1, wherein the ranging electromagnetic field strength sensor is included in a plurality of ranging electromagnetic field strength sensors spaced substantially equally apart from each other in an azimuthal direction.

6. The apparatus of claim 1, wherein the approximate range is determined according to a formula $\vec{H}_{Target}=\vec{H}_{Total}-\vec{H}_{Leakage}$, wherein $\vec{H}_{Total}$ comprises a total field measurement at the at least one ranging electromagnetic field strength sensor, wherein $\vec{H}_{Leakage}$ comprises a distorting field strength measurement, and wherein $\vec{H}_{Target}$ comprises an adjusted field measurement.

7. A system comprising:
a current source to couple current to at least one of a target well and a drilling well; and
an apparatus comprising a down hole tool housing attached to a ranging electromagnetic field strength sensor, the ranging electromagnetic field strength sensor to measure electromagnetic field strength components associated with an electromagnetic field originated by the current source, via at least one of direct transmission and backscatter transmission, when the down hole tool housing is disposed in the drilling well, to provide ranging measurements to calculate an approximate range between the target well and the drilling well, and a reference electromagnetic field strength sensor attached in a closed loop path around the down hole tool housing, to provide distorting field strength measurements;
wherein values of the ranging measurements are adjusted based, at least in part, on the distorting field strength measurements.

8. The system of claim 7, wherein the reference electromagnetic field strength sensor is used to measure the electromagnetic field strength components associated with the electromagnetic field originated by the current source, via the at least one of the direct transmission and the backscatter transmission, in conjunction with the ranging electromagnetic field strength sensor.

9. The system of claim 7, further comprising:
a range determination module to receive the ranging measurements and the distorting field strength measurements, and to provide the adjusted values of the ranging measurements to calculate the approximate range.

10. The system of claim 7, wherein the reference electromagnetic field strength sensor is disposed underneath the ranging electromagnetic field strength sensor.

11. The system of claim 7, wherein the ranging electromagnetic field strength sensor is included in a plurality of ranging electromagnetic field strength sensors spaced substantially equally apart from each other in an azimuthal direction.

12. The system of claim 7, wherein the approximate range is determined according to a formula $\vec{H}_{Target}=\vec{H}_{Total}-\vec{H}_{Leakage}$, wherein $\vec{H}_{Total}$ comprises a total field measurement at the at least one ranging electromagnetic field strength sensor, wherein $\vec{H}_{Leakage}$ comprises a distorting field strength measurement, and wherein $\vec{H}_{Target}$ comprises an adjusted field measurement.

13. A method comprising:
measuring electromagnetic field strength components associated with an electromagnetic field originating at a first well, via at least one of direct transmission and backscatter transmission, using at least one ranging electromagnetic field strength sensor attached to a housing, to provide ranging measurements;
obtaining distorting field strength measurements using a reference electromagnetic field strength sensor attached in a closed loop path around the housing; and
determining an approximate range between the first well and a second well in which the at least one ranging electromagnetic field strength sensor is disposed, based on the ranging measurements and the distorting field strength measurements.

14. The method of claim 13, wherein the reference electromagnetic field strength sensor comprises a toroidal antenna.

15. The method of claim 13, wherein the reference electromagnetic field strength sensor is attached to at least one of the ranging electromagnetic field strength sensor and the housing.

16. The method of claim 13, wherein the approximate range is determined according to a formula $\vec{H}_{Target}=\vec{H}_{Total}-\vec{H}_{Leakage}$, wherein $\vec{H}_{Total}$ comprises a total field measurement at the at least one ranging electromagnetic field strength sensor, wherein $\vec{H}_{Leakage}$ comprises a distorting field strength measurement, and wherein $\vec{H}_{Target}$ comprises an adjusted field measurement.

* * * * *